US005115227A

United States Patent [19]

Keiji

[11] Patent Number: 5,115,227

[45] Date of Patent: May 19, 1992

[54] INPUT DEVICE POSSESSING PLURAL FUNCTIONS

[75] Inventor: Yamaguchi Keiji, Nara, Japan

[73] Assignee: Sharp Kabushiki Kaisha, Osaka, Japan

[21] Appl. No.: 206,797

[22] Filed: Jun. 15, 1988

[30] Foreign Application Priority Data

Jun. 22, 1987 [JP] Japan ................................ 62-156224

[51] Int. Cl.[5] ................................................ G06K 9/22

[52] U.S. Cl. ...................................... 340/709; 382/59; 358/473; 340/710

[58] Field of Search ........................ 340/706, 710, 709; 178/18, 19; 382/59, 20; 358/293, 294, 286, 256, 285, 295, 473; 74/471 XY; 33/1 M; 250/221, 239

[56] References Cited

U.S. PATENT DOCUMENTS 4,804,949 2/1989 Faulkerson .......................... 340/709

4,818,978 4/1989 Karihara et al. .................... 340/706

*Primary Examiner*—Alvin E. Oberley

*Attorney, Agent, or Firm*—Pennie & Edmonds

[57] ABSTRACT

Disclosed is an input device possessing plural functions comprising a rotating element directed outward in part and free to rotate in arbitrary directions, turning amount detecting means for detecting the turning amount of the rotating element, image reading means for reading the original image, all composed in a one-body structure, and changeover means for changing over the position detecting function comprising the rotating element and turning amount detecting means, and the image reading function comprising the image reading means.

4 Claims, 4 Drawing Sheets

INPUT DEVICE POSSESSING PLURAL FUNCTIONS

Background of the Invention

This invention relates to an input device, and more particularly to an input device for feeding information into personal computer or other electronic appliances.

As the coordinate input device in a personal computer, an input device known as "mouse" is used. The mouse has a spherical rotating element accommodated in a housing, and the rotating element is turned by moving the housing on the floor with the rotating element directed outward from the bottom, and this turning amount is read by an encoder. The turning amount being read in this way is divided into components in two directions orthogonal to each other, and the divided components become, in said personal computer, input coordinate values in the vertical direction and horizontal direction in, for example, a cathode ray tube (CRT).

Besides, as an image input device in a personal computer, an image reading device known as image scanner is used. This image scanner comprises, basically, position detecting means in one direction realized, for example, by a roller, and a reading device defined in the scanning amount of the image to be read, corresponding to the position dislocation amount detected by this position detecting means, and the image read by this image reading device is delivered to said personal computer.

Conventionally, although it was often required to use both mouse and image scanner at the same time, there was no input device comprising them in one structure.

SUMMARY OF THE INVENTION

It is hence a primary object of this invention to present an input device capable of feeding information in plural manners.

It is another object of this invention to present an input device capable of feeding both position information and image information.

It is a further object of this invention to present an input device possessing the functions of both mouse and image scanner.

Other objects and further scope of applicability of the present invention will become apparent from the detailed description given hereinafter. It should be understood however, that the detailed description of and specific example, while indicating preferred embodiments of the invention, are given by way of illustration only, since various changes and modifications within the spirit and scope of the invention will become apparent to those skilled in the art from this detailed description.

To achieve the above objects, according to an embodiment of the present invention, the input device possessing plural functions comprises a rotating element directed outward in one part and free rotate in an arbitrary direction, turning amount detecting means for detecting the turning amount of the rotating element, and image reading device for reading the original image, all accommodated in a one-body structure, which also contains changeover means for changing over a position detecting function comprising the rotating element and turning amount detecting means, and an image reading function comprising the image reading means.

In the input device according to this invention, by integrally composing the rotating element, turning amount detecting means and image reading means, the position detecting function comprising the rotating element and turning amount detecting means, and the image reading function comprising the image reading means are changed over by changeover means. Hence, by one input device, at least two or more functions can be arbitrarily selected, so that the input device can be utilized very advantageously.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE EMBODIMENTS

Figure 1:
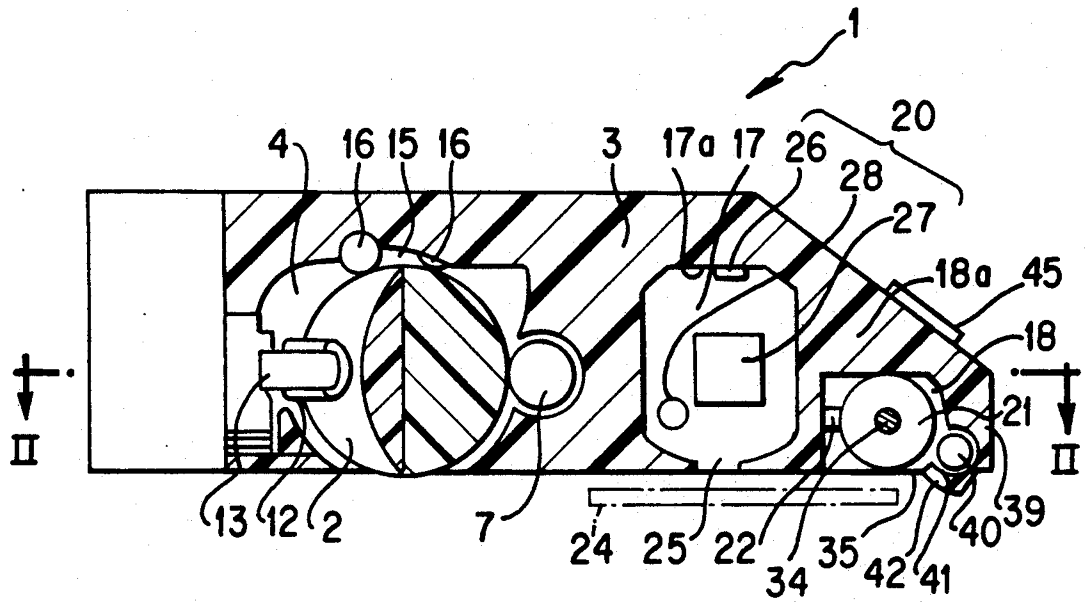
FIG. 1 is a longitudinal sectional view showing the composition of an input device 1 in one of the embodiments of this invention.
Figure 2:
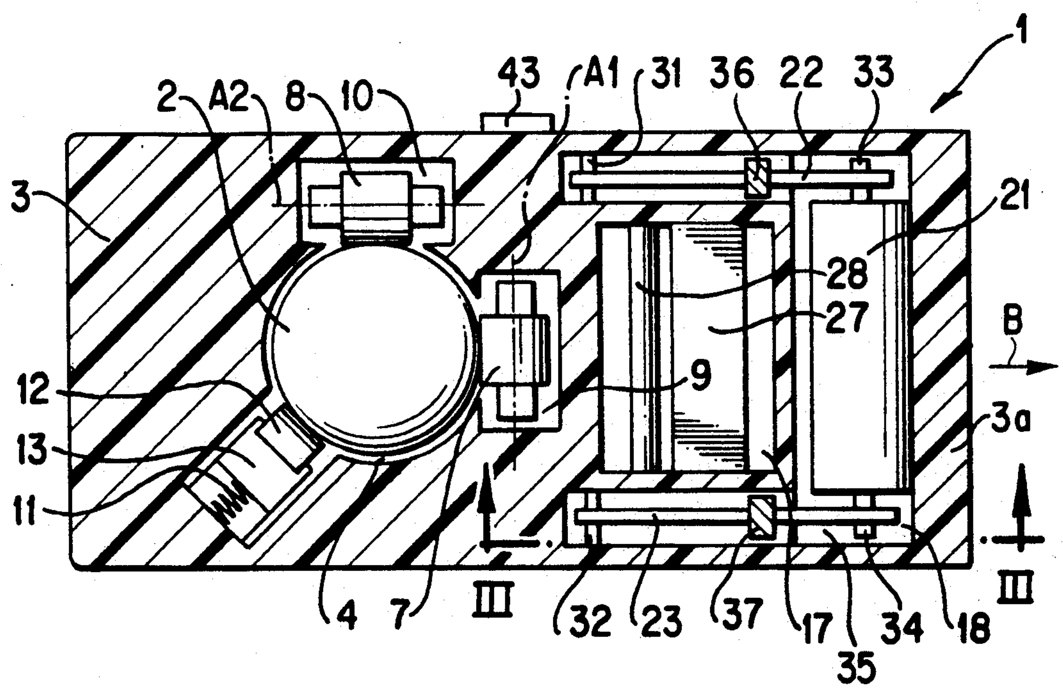
FIG. 2 is a sectional view seen from cut section line II—II in FIG. 1.
Figure 3:
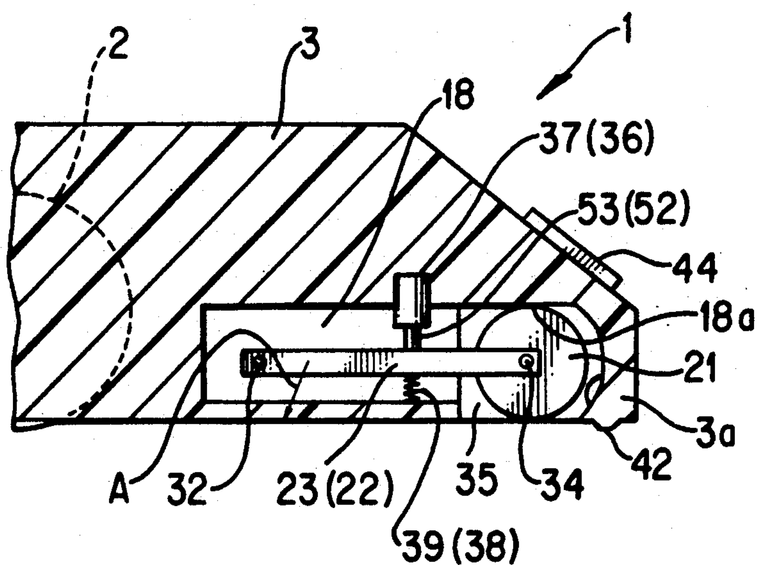
FIG. 3 is a sectional view seen from cut section line III—III in FIG. 2.
Figure 4:
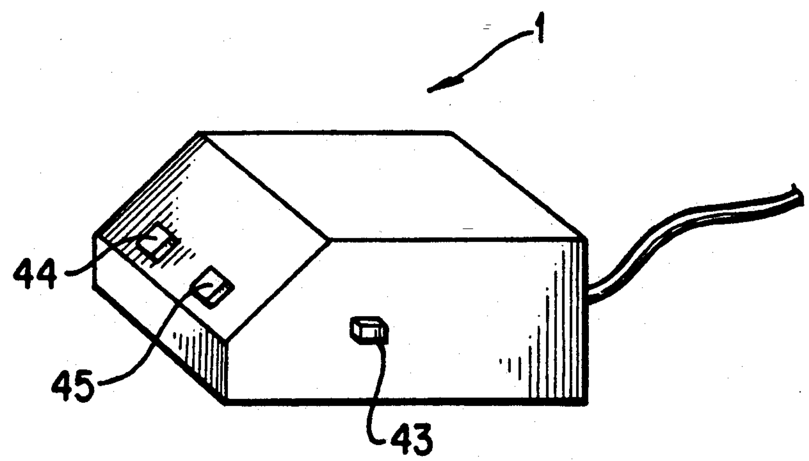
FIG. 4 is a perspective view of the input device 1.

FIG. 1 is a longitudinal sectional view showing the composition of an input device 1 in one of the embodiments of this invention, FIG. 2 is a sectional view seen from cut section line II—II in FIG. 1, FIG. 3 is a sectional view seen from cut section line III—III in FIG. 2, and FIG. 4 is a perspective view of the input device 1. The composition of the input device 1 is described below while referring to FIGS. 1 to 4.

The input device 1 has a ball 2 which is a rotating element made of a material relatively large in a frictional coefficient, such as polyurethane, and this ball 2 is accommodated in a ball accommodating part 4 in a housing 3 made of, for example, synthetic resin. In the housing 3, moreover, encoder device accommodating parts 9, 10 for accommodating encoder devices 7, 8 are formed continuously with said ball accommodating part 4.

The encoder device accommodating part 9 is formed consecutively with the ball accommodating part 4 in the longitudinal direction of the housing 3 (in the lateral direction in FIG. 2). That is, a rotation axial line A1 of the encoder device 7 is disposed in a state orthogonal to said longitudinal direction of the housing 3. A rotation axial line A2 of the encoder device 8 is disposed in a state orthogonal to said rotation axial line A1 of the encoder 7. By the encoder devices 7, 8 in such state of disposition, the component of turning amount along said longitudinal direction in the rotary motion in an arbitrary direction of the ball 2, and the component of turning amount in the direction orthogonal to the longitudinal direction can be individually detected.

In the housing 3, moreover, a pressure roller 12 for pressing the ball 2 by the spring force of a pressure spring 11 is supported on a bracket 13 continuously with said ball accommodating part 4.

An arc-shaped recess 15 is formed above the ball accommodating part 4 in FIG. 4, and a plurality of spheres 16 freely rotatable in arbitrary directions are buried at specified intervals in the circumferential direction of the ball 2. These spheres 16 are provided in order to prevent cancellation of sliding contact between the floor (not shown) and the ball 2 when the ball moves upward in the housing 3 due to the pressing force from the floor as the ball 2 is rotated, sliding in contact with the floor. In this way, the ball 2 is rotatably supported in the housing by two encoder devices 7, 8, pressure roller 12, and plural spheres 16.

At the right side of the ball accommodating part 4 in the housing 3 in FIG. 1, a reading device accommodating part 17 for accommodating a reading device 20 which is described later, a roller 21 and a roller accommodating part 18 for accommodating two support bars 22, 23 for supporting this roller 21 are formed. This roller accommodating part 18 possesses an approximately U-shape surrounding said reading device accommodating part 17 in the section shown in FIG. 2.

This reading device accommodating part 17 comprises a reading window 25 for reading an original 24 placed beneath the input device 1 in FIG. 1, and at the position corresponding to this reading window 25 at an upper end 17*a* in FIG. 1, a photo detector array 26 is disposed. Between this photo detector array 26 and said reading window 25, an optical fiber array 27 is disposed, and a light source 28 for illuminating the original 24 through the reading window 25 is provided near this optical fiber array 27. This light source 28, said photo detector array 20 and optical fiber array 27 are combined to compose a reading device 20. Meanwhile, the reading window 25, photo detector array 26, optical fiber array 27 and light source 28 are disposed so that their longitudinal directions may respectively cross orthogonally with the longitudinal direction of said input device 1.

Each one end of two support bars 22, 23 for supporting the roller 21 is fitted to shaft parts 31, 32 fixed on the housing 3 in a manner free to dislocate angularly. The roller 21 is supported at other ends of the two support bars 22, 23, in a manner free to dislocate angularly, by way of two shaft parts 33, 34 formed on said roller 21. An opening 35 directed downward in FIG. 1 is formed in the roller accommodating part 18, corresponding to the roller 21, so that the roller 21 can be projected outward from the housing 3 through this opening 35 as described below.

At the upper side in FIG. 3 near the central part in the longitudinal direction of said two support bars 22, 23, there are two electromagnetic plungers 36, 37 fixed on the housing 3 at the upper ends. At the lower side in FIG. 3 of these two support bars 22, 23, meanwhile, there are two coil springs 38, 39 fixed on the housing 3 at one end, at the positions corresponding to said two electromagnetic plungers 36, 37. These two coil springs 38, 39 are thrust with spring to the upper side in FIG. 3. Incidentally, while these two electromagnetic plungers 36, 37 are demagnetized, the roller 21 is stopped in the state abutting against the upper end 18*a* of the roller accommodating part 18 by the spring force of said two coil spring 38, 39 (hereinafter this state is referred to as stopped state).

At the front head part 3*a* formed at the right side in FIG. 1 of the housing 3, an encoder device accommodating part 41 for accommodating an encoder device 40 is formed. This encoder device accommodating part 41 is formed consecutively with the roller accommodating part 18 in the longitudinal direction of the housing 3. That is, the rotation axial line of the encoder device 40 is disposed orthogonal to the longitudinal direction of the housing 3. While the roller 21 is in the stopped state, a specified spacing is kept between the roller 21 and the encoder device 40. At the lower end of said front head part 3*a*, a sliding protrusion 42 sliding against the floor (not shown) as described below is formed.

The input device 1, thus, possesses the function as the mouse comprising the ball 2, and the function as the image scanner comprising the reading device 20, and these two functions are changed over by a change-over switch 43 placed at the side wall of the housing 3. On the surface of the housing 3, there are two operation switches 44, 45 to be used when the input device 1 functions as the mouse, so that the progress of program in the personal computer to which the input device 1 is connected is controlled.

Figure 5:
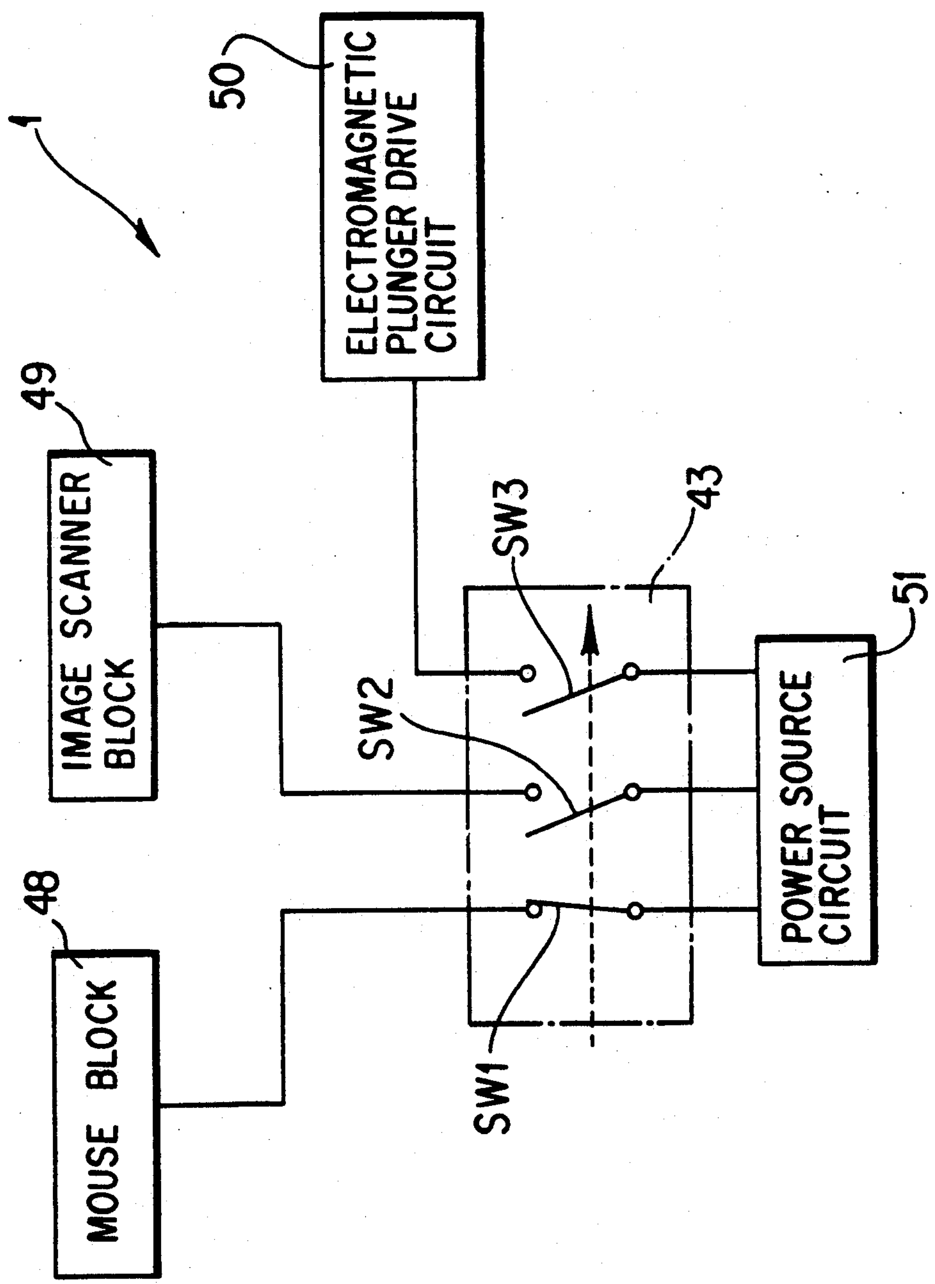
FIG. 5 is a block diagram showing a simplified electric composition of the input device 1.

FIG. 5 is a block diagram showing a simplified electric composition of the input device 1. A mouse block 48 containing the electric composition functioning as the mouse, and an image scanner block 49 containing the electric composition functioning as the image scanner are connected to a power source circuit 51 through switches SW1, SW2 in said change-over switch 43, respectively. A drive circuit 50 for driving said two electromagnetic plungers 36, 37 is connected also to the power source circuit 51 through a switch SW3 in the changeover switch 43. In this changeover switch 43, two switches SW2, SW3 are composed to as to cooperate. For example, when the switch SW1 is in conductive state, the two switches SW2, SW3 both fall in the cut-off state, and when the switch SW1 is cut off, the two switches SW2, SW3 come into conductive state.

In other words, when the changeover switch 43 is changed over to the mouse side, the switch SW1 is in conductive state, and the supply voltage from the power source circuit 51 is supplied to the mouse block 48, so that the input device 1 works as the mouse. On the other hand, when the changeover switch 43 is changed to the image scanner side, the two switches SW2, SW3 both come into conductive state, and both the image scanner block 49 and the plunger drive circuit 50 are powered from the power source circuit 51, so that the input device 1 works as the image scanner.

Here, the operation of the input device 1 is described when, for example, the changeover switch 43 is changed to the mouse side.

When the changeover switch 43 is at the mouse side, the two electromagnetic plungers 36, 37 are both demagnetized, and the roller 21 is held in the stopped state, so that the input device 1 is supported on the floor by the sliding protrusion 42 and the ball 2. Therefore, when this input device 1 is slid in an arbitrary direction on the floor, the ball 2 rotates in response, and this turning amount is detected by two encoder devices 7, 8. Thus, when the input device 1 is changed over to the mouse side by the changeover switch 43, the displacement of the input device 1 is detected, and it is delivered to the personal computer, functioning as the mouse.

When the changeover switch 43 is changed to the image scanner side, the operation of the input device 1 becomes as follows.

When the changeover switch 43 is changed to the image scanner side, the two electromagnetic plungers 36, 37 are excited, and the actuators 52, 53 are displaced downward in FIG. 3. As a result, resisting the spring force of the coil springs 38, 39, two support bars 22, 23 are angularly dislocated in the direction of arrow A around the shaft parts 31, 32, and the roller 21 is held in the state projected outward of the housing 3 from the opening (hereinafter this state is called operating state).

While the roller 21 is in operating state, the roller 21 abuts against the encoder device 40, and the encoder device 40 can detect the turning amount of the roller 21. Furthermore, when the roller 21 is in operating state, the roller 21 is held in the state being slightly projected from the housing 3 over the sliding protrusion 42. In this state, therefore, the input device 1 is supported on the floor by means of ball 2 and roller 21.

When the input device 1 is thus changed over to the image scanner side, the roller 21 is lowered, and the displacement in the longitudinal direction of the input device 1 is can be detected through the encoder device 40. Accordingly, when the input device 1 is changed over to the image scanner side to dislocated in the direction of arrow B, the reading device 20 can sequentially operate the original 24 depending on the displacement in the direction of arrow A detected through the roller 21, so that the function as the image scanner is realized.

In the input device 1 of this embodiment, as clear from the description hereabove, there are a function as mouse and a function as image scanner, and these two functions are mutually changed over by the changeover switch 43, and two functions can be realized in one input device 1, so that its utility is dramatically enhanced.

Figure 6:
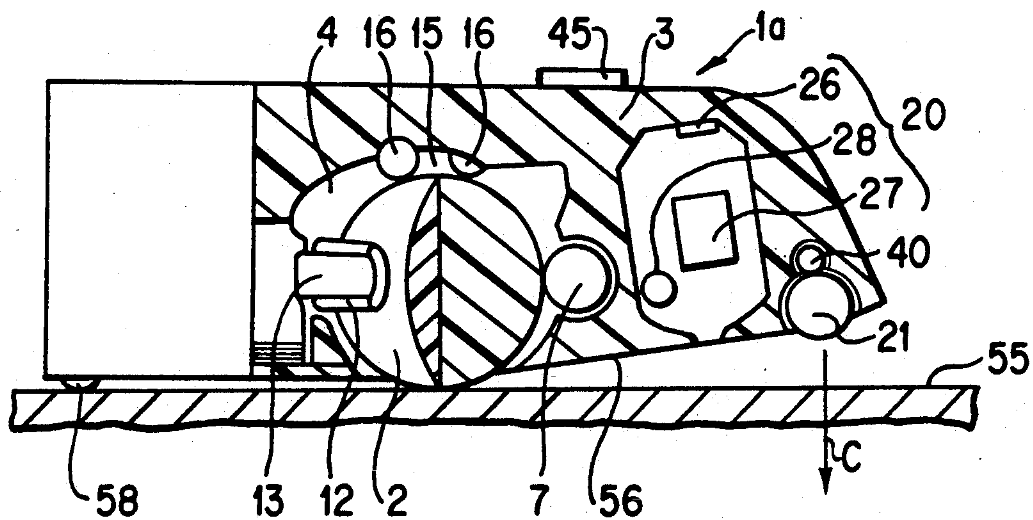
FIG. 6 is a sectional view showing the composition of an input device 1*a* in a different embodiment of this invention.

FIG. 6 is a sectional view showing the composition of an input device 1*a* of a different embodiment of this invention. This embodiment is similar to the first embodiment, and corresponding parts are identified with same reference numbers.

What is of note in this embodiment is that the elevating mechanism relating to the roller 21 of the first embodiment is eliminated by forming a taper surface 56 on the surface opposite to a floor 55 of the housing 3. Therefore, the roller 21 is rotatably supported on the housing 3, and the encoder device 40 is disposed in a state abutting against this roller 21. Furthermore, in this embodiment, in relation to the ball 2 of the housing 3, a sliding protrusion 58 is formed at the end of the opposite side to said taper surface 56.

In this input device 1*a*, its center of gravity is set between said sliding protrusion 58 and the ball 2. Therefore, in the state free from action of force from outside, this input device 1 is supported by the sliding protrusion 58 and ball 2 on the floor 55 as shown in FIG. 6. That is, when the changeover switch (not shown) is changed to the mouse side and the input device 1*a* is slide in this state, the function as the mouse is realized.

Figure 7:
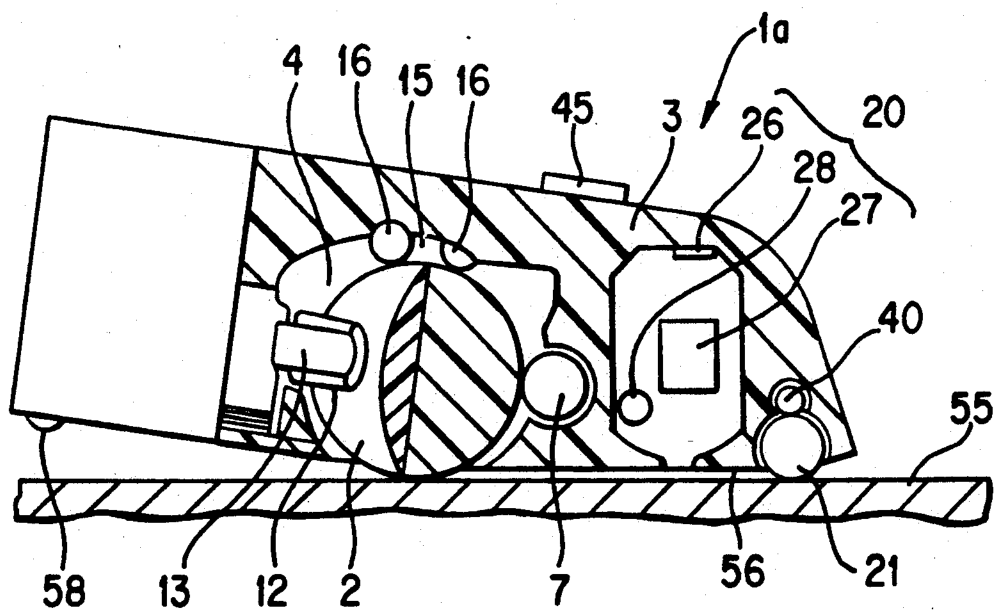
FIG. 7 is a sectional view for explaining the state of used of the input device 1*a*.

On the other hand, when the input device 1*a* is angularly dislocated in the direction of arrow C around the ball 2 to keep in the state shown in FIG. 7, the input device 1*a* is supported by the ball 2 and roller 21 on the floor 55. In this state, when the changeover switch is changed to the image scanner side and the input device 1*a* is slide in the longitudinal direction, the displacement is detected by the encoder device 40, and the reading device 20 can read the original corresponding to said displacement, so that the function as the image scanner is realized.

In this embodiment, thus, without using the elevating mechanism of the roller 21 as used in the first embodiment, it is possible to detect the change in the turning amount of the roller 21 in the image scanner mode, that is, the displacement of the input device 1*a* in the longitudinal direction, in a simple composition.

In a further different embodiment of this invention, as a mechanical constitution, it is possible to propose an input device, excluding the roller 21 and its related elevating mechanism in the first embodiment. That is, in the input device of this embodiment, it is composed to detect the displacement in the longitudinal direction of the input device in the image scanner mode by means of the encoder device 7. Hence, the input device of this embodiment is further simplified in structure, and the function as the image scanner can be realized.

Thus, in the first to third embodiments, the function as the mouse and the function as the image scanner can be both provided in one input device, and these two functions are changed over by the changeover switch. Therefore, the utility as the input device is extremely improved.

According to this invention, thus, since plural functions can be changed by the changeover means, one input device can possess plural functions, and its utility is superbly enhanced.

While only certain embodiments of the present invention have been described, it will be apparent to those skilled in the art that various changes and modifications may be made therein without departing from the spirit and scope of the present invention as claimed.

What is claimed is:

1. An input device movable along a surface and possessing plural functions, comprising:

a package housing shaped so as to have at least a first and second operatively stable rotational position for placement and movement on said surface such that when placed in said first position said housing can be operatively moved in an arbitrary X-Y direction;

a co-ordinate position means mounted within said housing, having a ball shaped roller which contacts said surface when said package housing is in said first and said second position, which outputs a signal corresponding to rotation of said roller indicative of X and Y motion of said device along said surface;

an image reading means mounted within said housing which scans images on said surface and outputs a signal indicative of a displacement of said housing along said surface and images on said surface when said housing is placed in said first rotational position;

a switch means attached to said housing for selecting between said co-ordinate position signal and said image reading signal;

a cylindrical guide roller having an axle around which said cylindrical roller rotates, said axle attached to said housing such that when housing is placed in said first rotational position said cylindrical roller does not contact said surface and when said housing is placed in said second position said cylindrical roller stably contacts said surface.

2. An input device movable along a surface as recited in claim 1 wherein when said housing is placed in said second rotational position operative motion of said housing is restricted to a direction perpendicular to the rotational axis of said cylindrical roller.

3. An input device movable along a surface and possessing plural functions as recited in claims 1 or 2 wherein when said housing is placed in a selected operative rotational position said device will operate and remain stably in that position without downward force applied to said housing.

4. An output device according to any one of claims 1 or 2 wherein the angle between said first and said second rotational position is less than 90°.

* * * * *